United States Patent
Leroux

(10) Patent No.: US 6,556,284 B1
(45) Date of Patent: Apr. 29, 2003

(54) SYSTEM FOR MEASURING THE LUMINANCE CHARACTERISTICS OF OBJECTS, IN PARTICULAR OBJECTS WITH LUMINANCE DEPENDENT ON EMITTING DIRECTION

(75) Inventor: Thierry Leroux, Herouville St Clair (FR)

(73) Assignee: Eldim, Herouville Saint Clair (FR)

( * ) Notice: Subject to any disclaimer, the term of this patent is extended or adjusted under 35 U.S.C. 154(b) by 0 days.

(21) Appl. No.: 09/673,676
(22) PCT Filed: Apr. 19, 1999
(86) PCT No.: PCT/FR99/00917
§ 371 (c)(1), (2), (4) Date: Oct. 19, 2000
(87) PCT Pub. No.: WO99/54693
PCT Pub. Date: Oct. 28, 1999

(30) Foreign Application Priority Data

Apr. 20, 1998 (FR) .............................. 98 04910

(51) Int. Cl.$^7$ ................................. G01J 1/00
(52) U.S. Cl. ..................................... 356/121
(58) Field of Search .................. 356/121, 122; 250/237 R

(56) References Cited

U.S. PATENT DOCUMENTS 3,802,785 A * 4/1974 Hankins et al. ............. 356/225
4,093,384 A    6/1978 Ferguson ..................... 356/183

FOREIGN PATENT DOCUMENTS

DE   196 02 862 C1   7/1997
FR   2 715 470        7/1995

* cited by examiner

Primary Examiner—Michael P. Stafira
(74) Attorney, Agent, or Firm—Pearne & Gordon LLP

(57) ABSTRACT

A system for measuring the luminance characteristics of objects, particularly objects with luminance dependent on the emission direction.

This system includes an image sensor (8) and optical means (16, 18, 26, 28) provided to form the image of the totality of an object (6) on the sensor and to select, for each point of the object, with a view to forming the corresponding image-point, those of the light rays coming from this point of the object which propagate in a way approximately parallel to the optical axis (X) of the optical means.

13 Claims, 2 Drawing Sheets

SYSTEM FOR MEASURING THE LUMINANCE CHARACTERISTICS OF OBJECTS, IN PARTICULAR OBJECTS WITH LUMINANCE DEPENDENT ON EMITTING DIRECTION

TECHNICAL FIELD

The present invention relates to a system for measuring the luminance characteristics of objects, particularly objects with luminance dependent on the emission direction.

It applies for example to projection screens, to cathode ray tubes, to lighting devices and to display screens such as liquid crystal displays, plasma displays, electroluminescent displays and microtip screens.

THE PRIOR ART

Several systems for measuring the luminance characteristics of objects in accordance with a geometrical position so as to characterise their uniformity and properties are already known. Such systems may be used with the objects given above for example.

In particular an electromechanical system is known which is diagrammatically shown in FIG. 1.

This system includes:

a measuring instrument 2, for example a photometer, and movement means 4 of this instrument in front of an object to be measured 6 (these means 4 being symbolised by arrows in FIG. 1).

This electromechanical system allows measurements to be taken along the optical axis X of the measuring instrument (and therefore according to an angle θ zero relative to this axis) but has however numerous drawbacks. In particular the measurements are taken by sampling. Only the positions selected are measured and no information is known about luminance in the intermediate positions. No certainty exists as to the value of the luminance outside that of the points measured. Moreover, the measurements, of duration $T_0$, are taken in series, one after the other. If a great number N of points are to be measured in order to be able to have maximum information, the complete measurement of the object takes a time $NXT_0$.

Another measurement system is also known and this is diagrammatically shown in FIG. 2.

This system includes:

a matrix sensor 8 of the CCD type or similar and
a lens 10 which is between this sensor and the object 6 to be measured and allows the image of this latter to be formed on the sensor.

Thus, at one and the same time, an image of the object to be measured is obtained on the sensor. The different points of the image correspond to the measurements relative to the different points of the object to be measured.

The main advantages of this sensor system are as follows:

Measurement speed is increased. Indeed, measurement, of duration $T_1$, does not depend (or only slightly) on the number of points measured. All the information is available. There is no risk of seeing a detail of the image evade measurement. An integration (summation) of all the values obtained gives with certainty a value of the luminous flux emitted by the object.

However the system shown in FIG. 2 has a serious drawback which is shown diagrammatically by FIG. 3. The lens 10, the axis of which is denoted X and which is conventionally used for such a system, operates at a constant image size $D_2=2d_2$. An object of size $D_2=2d_1$ must therefore be at a distance $L_1$ from this lens such that:

$$L_1/(2d_1)=L_2/(2d_2)=K$$

where $L_2$ is the distance between the lens 10 and the sensor 8 and K is a constant.

The object is observed along an angle θ which depends on the measured point of the object (θ is counted relative to a straight line passing through this point and parallel to the optical axis X of the lens 10) and which, for the end points, takes a value $θ_M$ (FIG. 2) little different from tan $θ_M$ and therefore little different from $d_2/L_2$ in other words from $1/(2K)$.

Usually K is of the order of 2–5 to 3 (which means it is necessary to place 75 cm from the lens a 12' (about 30 cm) diagonal screen which it is wished to measure) so that $θ_M$ is of the order of 12°. Measurements are therefore taken at a variable angle, according to the position, between 0° (measurement along the axis X) and ±12°.

This would not be a drawback if the objects measured had an emission characteristic such that the luminance does not vary in accordance with the light emission direction in other words in accordance with the angle θ.

This is not usually the case and it is clear that a system of the type of that in FIGS. 2 and 3 does not allow the emission uniformity of an object to be measured independently of the emission characteristic of that object.

DISCLOSURE OF THE INVENTION

The purpose of the present invention is to overcome this drawback.

It relates a system allowing the luminance characteristics of objects to be accurately measured, whether or not their luminance varies in accordance with the emission direction.

The invention combines the advantages of the system in FIG. 1 (with which measurements are taken at θ=0°) and those of the system in FIG. 2 (with which the measurements are taken rapidly).

In an exact way, an object of the present invention is a system for measuring the luminance characteristics of objects, this system including:

an image sensor and optical means having an optical axis and provided to form the image of the totality of an object on the sensor, each point of the image allowing a measurement to be taken on a point of the object, this system being characterised in that the optical means are additionally provided to select, for each point of the object, with a view to forming the corresponding image-point, those of the light rays coming from this point of the object which propagate in a way approximately parallel to the optical axis of the optical means.

According to a preferred embodiment of the system object of the invention, the optical means include:

a first lens placed facing the object, a diaphragm placed between the first lens and the sensor and able to let pass, among the light rays coming to it from the object through the first lens, only those which propagate from the object in a way approximately parallel to the optical axis of the first lens, and auxiliary optical means placed between the diaphragm and the sensor and provided to form, from the light rays which the diaphragm lets pass, the image of the object in an observation plane, the sensor being approximately placed in this observation plane.

Preferably, the object is approximately placed in the object focal plane of the first lens and the diaphragm is approximately placed in the image focal plane of this first lens.

According to a first particular embodiment of the invention, the auxiliary optical means include a second lens provided to form the image of the object in the observation plane.

According to a second particular embodiment, the auxiliary optical means include:

- a second lens provided to form an intermediate image of the object in an intermediate plane and
- a third lens placed between the second lens and the sensor and provided to form the image of the object in the observation plane from the intermediate image and to adapt the size of the image of the object to the size of the sensor.

The aperture of the diaphragm can be variable. Moreover, the system object of the invention can include an optical filtering means of the light coming from the object.

In the case of the first particular embodiment mentioned above, this filtering means is preferably approximately placed in the observation plane, facing the sensor. In the case of the second particular embodiment, this filtering means is preferably approximately placed in the intermediate plane.

In the case of one or the other of these particular embodiments, the second lens is preferably provided in order that the light rays which come from the object and which reach the optical filtering means are perpendicular to the plane where this optical filtering means is located.

The sensor is preferably of the matrix type.

Indeed a device for surveying the luminous emission properties of a light emitting surface is known from the document FR2715470A. However, in this document, it is a question of measuring average intensity on a surface delimited by a diaphragm, by means of a single sensor. The information obtained is a single quantity. The means implemented aim to obtain a uniform response over a controlled surface size.

On the contrary, in the present invention, it is a question of measuring the luminance, point by point, of an extended object. The information obtained is a set of quantities (cartography). The means implemented aim to make an observation at a constant angle.

BRIEF DESCRIPTION OF THE DRAWINGS

The present invention will be better understood from reading the description of embodiment examples given below, purely indicatively and in no way restrictively, with reference to the appended drawings in which.

DETAILED DISCLOSURE OF PARTICULAR EMBODIMENTS

Figure 1:
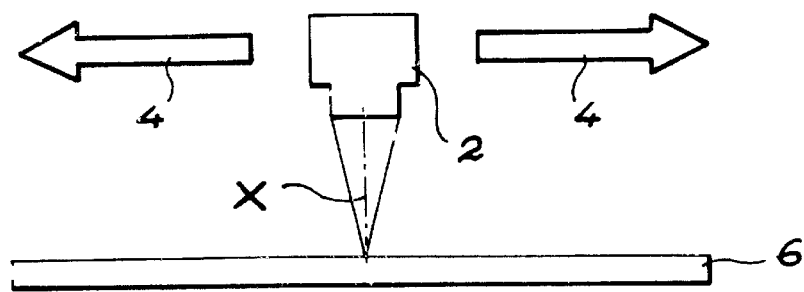
FIG. 1, already described, is a diagrammatic view of a known system for measuring the luminance characteristics of objects, FIG. 2, already described, is a diagrammatic view of another known system for measuring such characteristics, FIG. 3, already described, shows diagrammatically the drawbacks of this other known system.
Figure 2:
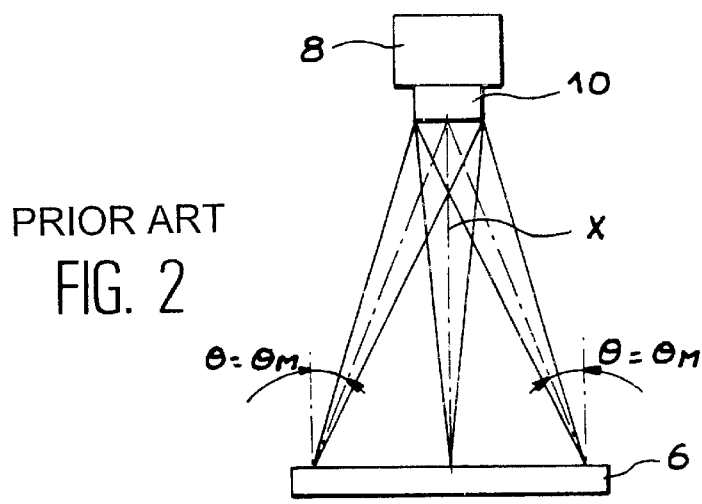
Figure 3:
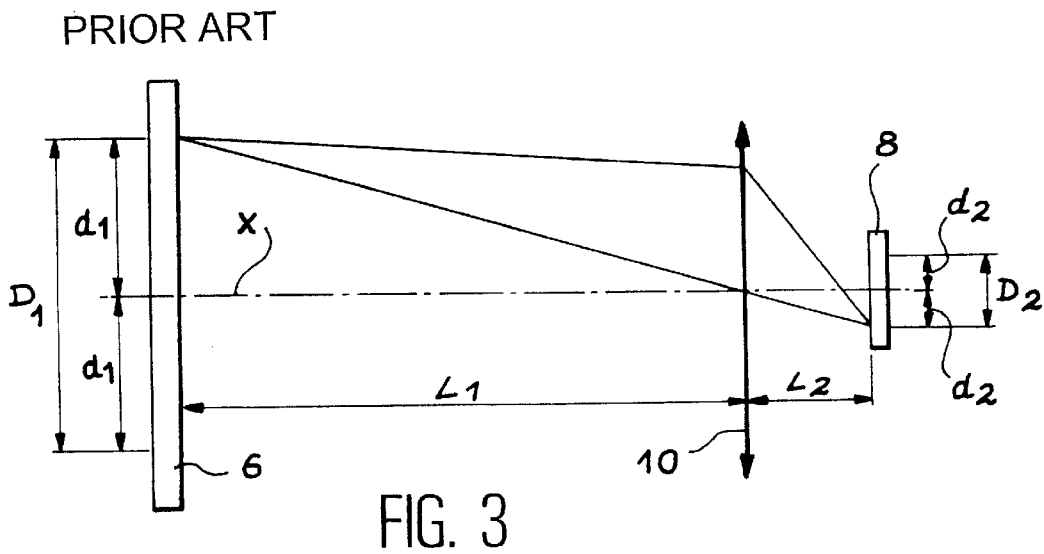
Figure 4:
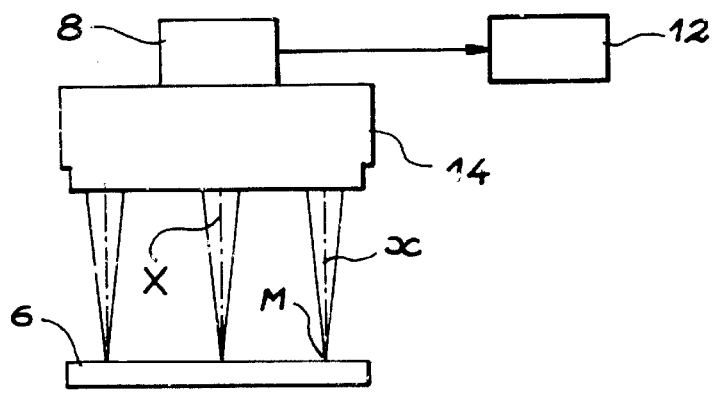
FIG. 4 shows diagrammatically the principle of the invention.

In FIG. 4 can be seen a system according to the invention, allowing the luminance characteristics of objects to be measured. This system includes an image sensor 8 connected to electronic means 12 intended to process the signals supplied by this sensor, and optical means 14 allowing the image of the totality of an object 6 to be formed on the sensor 8, each point of the image allowing a measurement to be taken on a point of the object.

According to the invention the optical means 14 makes it possible moreover to select, for each point M of the object, with a view to forming the corresponding image-point, those of the light rays coming from this point M which propagate approximately along the straight line x passing through M and parallel to the optical axis X of the optical means 14.

The object 6 is for example a display screen which has been switched on (or a projection screen lit by means not shown) the luminance characteristics of which it is desired to measure.

The sensor 8 is a sensor of the matrix type, for example a CCD sensor or similar, and the electronic means 12 receive the signals supplied by this sensor and process them in a known way in order to determine the luminance characteristics of the object.

Figure 5:
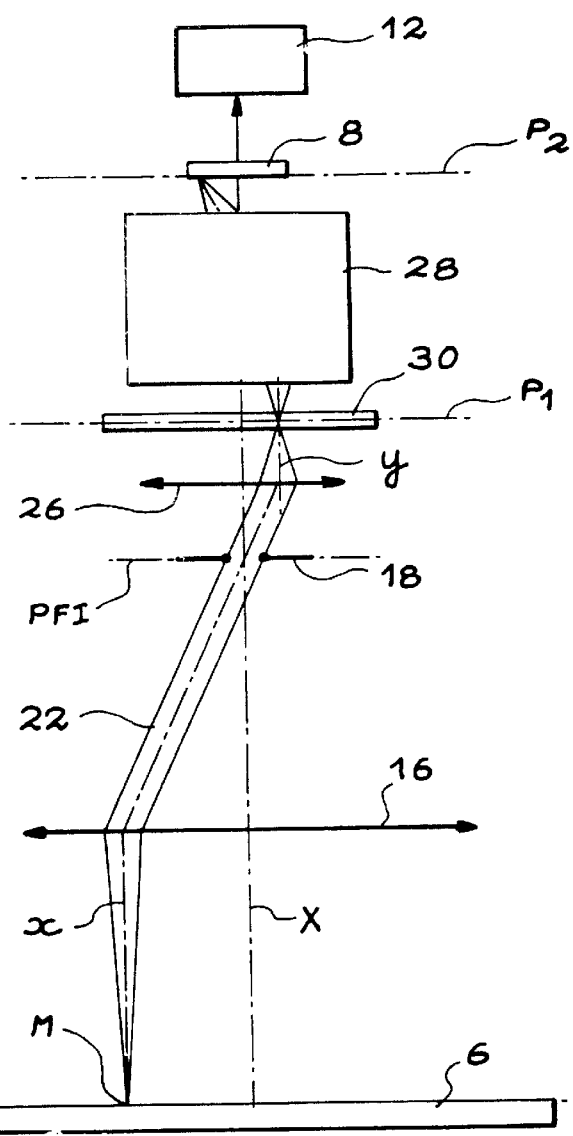
FIG. 5 is a diagrammatic view of a particular embodiment of the system object of the invention.

FIG. 5 is a diagrammatic view of a particular embodiment of the system object of the invention.

In the example in FIG. 5, the optical means 14 of FIG. 4 include a first lens 16 the optical axis of which constitutes the axis X, a diaphragm 18 and auxiliary optical means which will be discussed below. The lens 16 is placed between the diaphragm 18 and the object 6. As for the diaphragm 18, this is placed between the lens 16 and the sensor 8 and provided so as to let pass, among the light rays coming to it from the object 6 through the lens 16, only those which propagate from the object in a way approximately parallel to the axis X in other words approximately along straight lines parallel to X such as the straight line x passing through the point M of the object.

The surface of the object 6 is approximately placed in the object focal plane OFP of the lens 16 and the diaphragm 18 is approximately placed in the image focal plane IFP of the lens 16.

The aperture of the diaphragm 18 allows the angle of the scanning beams such as the light beam 22 coming from the object to be controlled.

The diaphragm 18 may be fitted with means not shown allowing its aperture to be modified in order to modify the scanning beam angle.

The auxiliary optical means are placed between the diaphragm and the sensor 8 and are provided to form, from the light rays which the diaphragm lets pass, the image of the object 6 in an observation plane where the sensor 8 or more exactly the input face of this sensor 8 is approximately placed.

In a first example the auxiliary optical means include simply a lens 26 provided to form the image of the object in a plane $P_1$ which then constitutes the observation plane where the sensor 8 is approximately placed.

In a second example (FIG. 5) the auxiliary optical means include this lens 26 provided to form an intermediate image of the object 6 in the plane $P_1$, which then constitutes an intermediate plane, and additionally another lens 28 placed between the lens 26 and the sensor. This other lens 28 constitutes a relay lens or transport lens which allows the image of the object to be formed, from the intermediate image, in a plane $P_2$ then constituting the observation plane where the sensor 8 is approximately placed. This lens 28 is intended to "set to scale", in the plane $P_2$, the image obtained in the plane P1, i.e. to adapt the size of this image to the size of the sensor.

In the system in FIG. 5, an optical filter 30 can also be used. This may be for example a spectral response correction filter which selects wavelengths so as to reproduce a particular response (for example response by the eye) or a polarising filter to select a particular polarisation or a filter which absorbs the light in a variable way.

The filter 30 may be placed anywhere between the object 6 and the sensor 8 but, in order to have reasonable size, it is to advantage placed at the level of the plane $P_1$ or in a plane parallel to this plane $P_1$ and near to it. Clearly, when the sensor is placed at the level of plane $P_1$, the filter 30 is placed facing the sensor near to it, between this plane $P_1$ and the lens 26.

In the event of the filter 30 being used, the lens 26 is to advantage optimised so that the light rays which come from the object and which reach this filter 30 (after having passed through the lens 26) are perpendicular to the plane where the filter 30 is placed (and are therefore directed along a perpendicular y to the plane $P_1$ when the filter is located in this plane $P_1$) so as to avoid the transmission of the system being dependent on the position observed on the object.

It will be noticed that the aperture of the diaphragm 18 is centred on the optical axis X common to the lenses 16, 26 and 28 (when the latter is used).

A system of the type of the one in FIG. 5 meets all the desired criteria:

measurements perpendicularly to the object whatever the measured point of the object, speed of measurement (collective measurement)

exhaustive measurement (all the points of the object are measured).

It is also appropriate to note that an increased facility of use is obtained by means of the good depth of field of a system according to the invention, of the type of the one in FIG. 5, due to its design. This property allows excellent tolerance of any focusing defect, which is not the case with known systems.

What is claimed is:

1. A system for measuring point by point the luminance characteristics of an extended object, this system including:

an image sensor (8) and optical means (14) having an optical axis (X) and provided to form a image of the totality of the object (6) on the sensor, each point of the image allowing a measurement to be taken on a point of the object, this system being characterized in that the optical means (14) are additionally provided to select, for each point of the object, with a view to forming the corresponding image-point, those of the light rays coming from this point of the object which propagate in a way approximately parallel to the optical axis of the optical means, the observation of the object being effected at a constant angle.

2. A system according to claim 1, wherein the optical means (14) include:

a first lens (16) placed facing the object, a diaphragm (18) placed between the first lens and the sensor and able to let pass, among the light rays coming to it from the object through the first lens, only those which propagate from the object in a way approximately parallel to the optical axis (X) of the first lens (16), and auxiliary optical means (26, 26–28) placed between the diaphragm and the sensor and provided to form, from the light rays which the diaphragm lets pass, the image of the object in an observation plane ($P_1$;$P_2$), the sensor being approximately placed in this observation plane.

3. A system according to claim 2, wherein the object (6) is approximately placed in the object focal plane (OFP) of the first lens (16) and the diaphragm (18) is approximately placed in the image focal plane (IFP) of this first lens (16).

4. A system according to claim 2, wherein the auxiliary optical means include a second lens (26) provided to form this image of the object in the observation plane ($P_1$).

5. A system according to claim 2, wherein the auxiliary optical means include:

a second lens (26) provided to form an intermediate image of the object in an intermediate plane ($P_1$) and a third lens (28) placed between the second lens and the sensor and provided to form the image of the object in the observation plane ($P_2$) from the intermediate image and to adapt the size of the image of the object to the size of the sensor.

6. A system according to claim 2 wherein the aperture of the diaphragm (18) is variable.

7. A system according to claim 1, including additionally an optical filtering means (30) of the light coming from the object.

8. A system according to claim 4, including additionally an optical filtering means (30) of the light coming from the object, this filtering means being placed approximately in the observation plane ($P_1$), facing the sensor.

9. A system according to claim 5, including additionally an optical filtering means (30) of the light coming from the object, this filtering means being placed approximately in the intermediate plane ($P_1$).

10. A system according to claim 7, wherein the second lens (26) is provided in order that the light rays which come from the object and which reach the optical filtering means (30) are perpendicular to the plane where this optical filtering means is located.

11. A system according to claim 1, wherein the sensor (8) is of the matrix type.

12. A system according to claim 1, including additionally electronic means (12) for processing the signals supplied by the sensor (8) to determine the luminance characteristics of the object (6).

13. A system according to claim 8, wherein the second lens is provided in order that the light rays which come from the object and which reach the optical filtering means are perpendicular to the plane in which the optical filtering means is located.

* * * * *